(12) United States Patent
Lukomski

(10) Patent No.: US 11,789,412 B2
(45) Date of Patent: Oct. 17, 2023

(54) FUNCTIONAL LIMITS FOR TORQUE REQUEST BASED ON NEURAL NETWORK COMPUTING

(71) Applicant: STEERING SOLUTIONS IP HOLDING CORPORATION, Saginaw, MI (US)

(72) Inventor: Tomasz Lukomski, Malopolska (PL)

(73) Assignee: Steering Solutions IP Holding Corporation, Saginaw, MI (US)

( * ) Notice: Subject to any disclaimer, the term of this patent is extended or adjusted under 35 U.S.C. 154(b) by 54 days.

(21) Appl. No.: 17/676,642

(22) Filed: Feb. 21, 2022

(65) Prior Publication Data

US 2022/0299947 A1  Sep. 22, 2022

Related U.S. Application Data

(60) Provisional application No. 63/164,200, filed on Mar. 22, 2021.

(51) Int. Cl.
*B62D 6/00* (2006.01)
*G05B 13/02* (2006.01)

(52) U.S. Cl.
CPC ........... *G05B 13/027* (2013.01); *B62D 6/00* (2013.01)

(58) Field of Classification Search
CPC ................................ G05B 13/027; B62D 6/00
See application file for complete search history.

(56) References Cited

FOREIGN PATENT DOCUMENTS

| DE | 102016212097 A1 | 1/2018 |
| DE | 102017220973 A1 | 5/2019 |
| DE | 102019212432 B3 | 12/2020 |
| DE | 102020125982 A1 | 4/2021 |
| DE | 102020127049 A1 | 4/2021 |
| DE | 102020208860 A1 | 1/2022 |
| DE | 102021111140 A1 | 4/2022 |
| DE | 102021129404 A1 | 7/2022 |

OTHER PUBLICATIONS

Kim et al., "Design of Sensor Permanent Fail-safe Algorithm based on Deep Learning for 100Nm class Electro-Hydraulic Power Steering System of Medium and Heavy Commercial Vehicle," International Conference on High Performance Big Data and Intelligent Systems, 2019, 6 pages.
Zang et al., "Fuzzy Neural Network PID Control for Electric Power Steering System," Proceedings of the IEEE International Conference on Automation and Logistics, Aug. 2007, 6 pages.
(Continued)

*Primary Examiner* — Mathew Franklin Gordon
(74) *Attorney, Agent, or Firm* — Dickinson Wright PLLC

(57) ABSTRACT

A method for calculating at least one functional limit for a requested assist torque in a steering system. The method includes receiving at least one input and communicating the at least one input to an artificial neural network, wherein the artificial neural network is configured to calculate an assist torque limit corresponding to the requested assist torque. The method also includes receiving, from the artificial neural network, the assist torque limit corresponding to the requested assist torque and controlling at least one aspect of the steering system using the requested assist torque and the assist torque limit.

20 Claims, 4 Drawing Sheets

(56) References Cited

OTHER PUBLICATIONS

Geng, "Modeling and Design of Fuzzy-Neural Network Controller of Electric Power Steering System," Applied Mechanics and Materials, vol. 596, 2014, 5 pages.

Garimella et al., "Neural Network Modeling for Steering Control of an Autonomous Vehicle," IEEE/RSJ International Conference on Intelligent Robots and Systems, Sep. 2017, 7 pages.

Official Letter from the German Patent and Trademark Office for related German Patent Application 102022104994.9 dated Nov. 2, 2022, 12 pages.

FUNCTIONAL LIMITS FOR TORQUE REQUEST BASED ON NEURAL NETWORK COMPUTING

CROSS-REFERENCES TO RELATED APPLICATIONS

This patent application claims priority to U.S. Provisional Patent Application Ser. No. 63/164,200, filed Mar. 22, 2021 which is incorporated herein by reference in its entirety.

TECHNICAL FIELD

This disclosure related to functional limits for vehicle torque requests, and in particular to systems and methods for torque request functional limits based on neural network computing.

BACKGROUND

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

The steering system typically includes various torque paths for providing torque to various components of the steering system. Typically, each torque path includes a firewall for providing functional diagnostics and for protecting the components of the steering system against erroneous or malicious torque commands.

SUMMARY

This disclosure relates generally to steering systems.

An aspect of the disclosed embodiments includes a method for calculating at least one functional limit for a requested assist torque in a steering system. The method includes receiving at least one input and communicating the at least one input to an artificial neural network, wherein the artificial neural network is configured to calculate an assist torque limit corresponding to the requested assist torque. The method also includes receiving, from the artificial neural network, the assist torque limit corresponding to the requested assist torque and controlling at least one aspect of the steering system using the requested assist torque and the assist torque limit.

Another aspect of the disclosed embodiments includes a system for calculating at least one functional limit for a requested assist torque in a steering system. The system includes a processor and a memory. The memory includes instructions that, when executed by the processor, cause the processor to: receive at least one input; communicate the at least one input to an artificial neural network, wherein the artificial neural network is configured to calculate an assist torque limit corresponding to the requested assist torque; receive, from the artificial neural network, the assist torque limit corresponding to the requested assist torque; and control at least one aspect of the steering system using the requested assist torque and the assist torque limit.

Another aspect of the disclosed embodiments includes an apparatus for calculating at least one functional limit for a requested assist torque in a steering system. The apparatus includes a processor and a memory. The memory includes instructions that, when executed by the processor, cause the processor to: receive at least one input that includes at least one of a handwheel torque, a handwheel angle, a motor velocity, a vehicle speed, and an estimated motor torque; communicate the at least one input to an artificial neural network trained using data corresponding to one or more steering maneuvers, wherein the artificial neural network is configured to calculate an assist torque limit corresponding to the requested assist torque; receive, from the artificial neural network, the assist torque limit corresponding to the requested assist torque; and control at least one aspect of the steering system using the requested assist torque and the assist torque limit.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
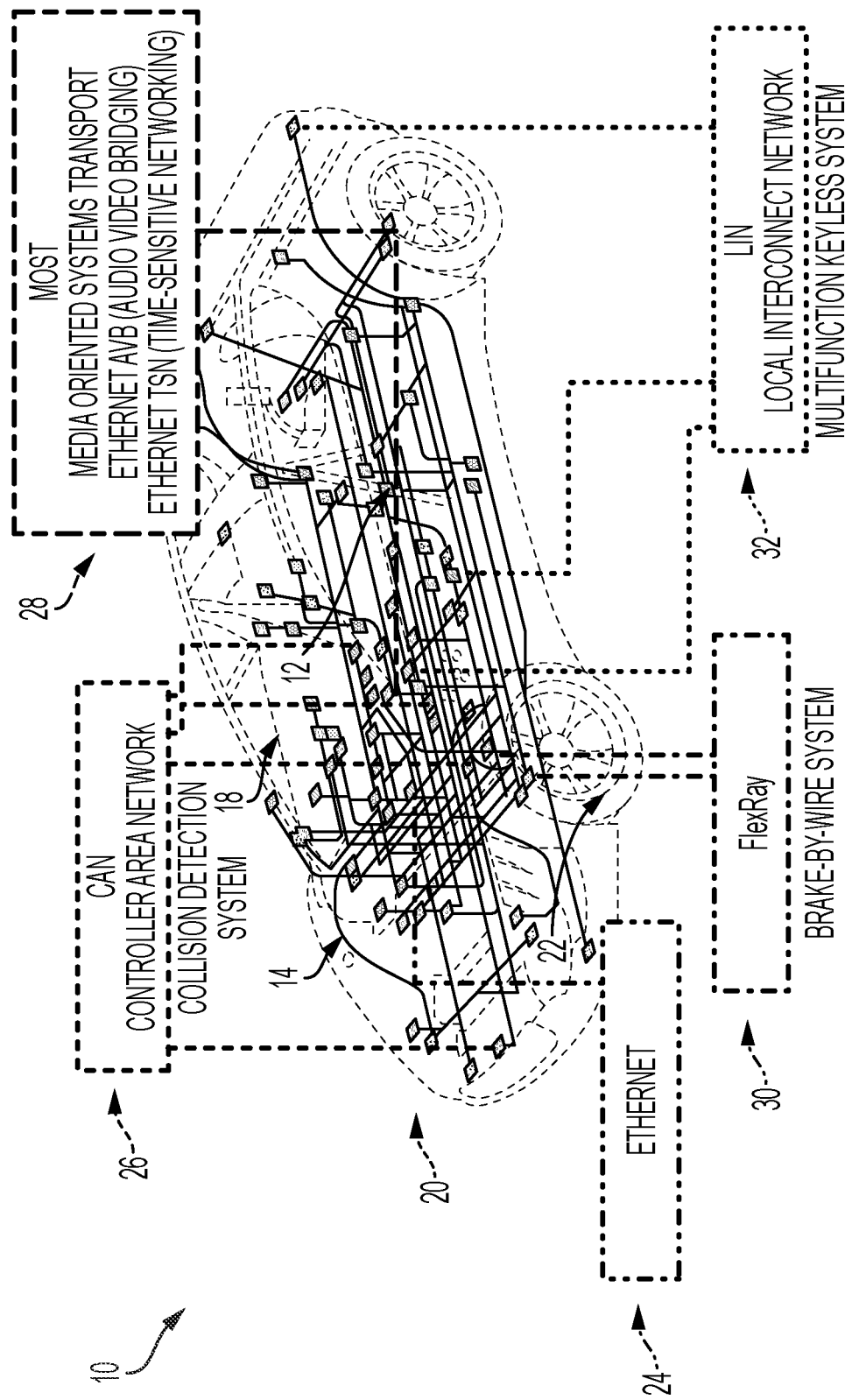
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system.

The steering system of such a vehicle typically controls various aspects of vehicle steering including providing steering assist to an operator of the vehicle, controlling steerable wheels of the vehicle, and the like. The steering system typically includes various torque paths for providing torque to various components of the steering system. For example, in steering systems include an open-loop feedback control system, the torque paths my include an assist torque path, a damping torque path, a return torque path, an end of travel torque path, other suitable torque paths, or a combination thereof. In steering systems that include a closed-loop feedback control system, the closed-loop-feedback control system may include a global limiter.

Typically, each torque path includes a firewall for providing functional diagnostics and for protecting the components of the steering system against erroneous or malicious torque commands. This may require tuning each firewall separately, which may be relatively time consuming and may require expert knowledge. For closed-loop feedback control systems, the global limiter may be relatively complex and may be relatively difficult to turn (e.g., due to the global limiter account for default operating characteristics, dynamic characteristics of the steering system, and overlay commands). Additionally, or alternatively, tuning such firewalls may be prone to human error.

Accordingly, systems and methods, such as those described herein, configured to use a trained artificial neural network to calculate, in real-time or near real-time, a functional limit for a requested assist torque, may be desirable. In some embodiments, the systems and methods described herein may be configured to generate an artificial neural network global limiter that automatically reacts to all steering system inputs and outputs. The systems and methods described herein may be configured to provide a robust and universal solution for open-loop feedback control systems and closed-loop feedback control systems, which may reduce or eliminate firewall tuning and which may reduce or eliminate a need for specific knowledge of the steering system or calibration of the steering system.

In some embodiments, the systems and methods described herein may be configured to train the artificial neural network (e.g., which may include a deep learning system, machine learning models, artificial intelligent, artificial neural networks, and the like) based on data corresponding to a plurality of recorded (e.g., captured, sensed, measured, and the like) vehicle maneuvers (e.g., including steering maneuvers and/or other suitable maneuvers) that take under consideration all aspects of system behaviors (e.g., return, damping, end of travel, other suitable aspects and/or behaviors, or a combination thereof). The systems and methods described herein may be configured to train and test the artificial neural network offline (e.g., before implementation in the vehicle). In some embodiments, the artificial neural network may include a self-tuning network (e.g., the network may self tune during the training processes), which may reduce or eliminate manual tuning.

In some embodiments, the systems and methods described herein may be configured to measure various system characteristics (e.g., such as handwheel torque, motor velocity, estimated motor torque command, and the like). The systems and methods described herein may be configured to communicate the measured characteristics (e.g., as inputs) to the artificial neural network. The artificial neural network may process the inputs (e.g., including all vehicle driving conditions and dynamics of the vehicle) and generate a final limitation value.

In some embodiments, the systems and methods described herein may be configured to provide a single component (e.g., single firewall mechanism) for use in open-loop feedback control systems and closed-loop feedback control systems, which may provide functional diagnostic and limitation, without specific knowledge of the vehicle or vehicle tuning.

In some embodiments, the system and methods described herein may be configured to receive at least one input. The at least one input may include a handwheel torque, a handwheel angle, a motor velocity, a vehicle speed, an estimated motor torque command, other suitable input, or a combination thereof. The systems and methods described herein may be configured to communicate the at least one input to an artificial neural network. The artificial neural network may be configured to calculate an assist torque limit corresponding to a requested assist torque. In some embodiments, the artificial neural network may be trained using data corresponding to one or more steering maneuvers. The systems and methods described herein may be configured to receive, from the artificial neural network, the assist torque limit corresponding to the requested assist torque. The systems and methods described herein may be configured to control at least one aspect of the steering system using the requested assist torque and the assist torque limit.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2A:
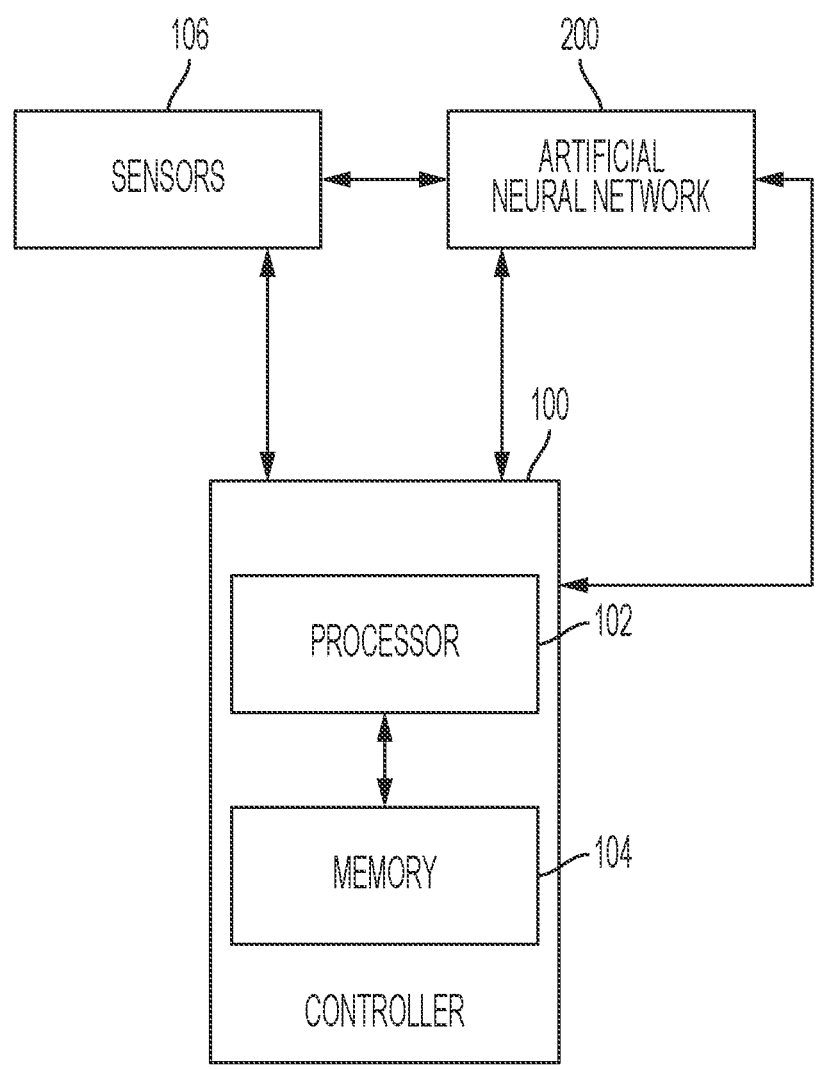
FIG. 2A generally illustrates a steering system control system according to the principles of the present disclosure.

In some embodiments, the steering system may include a steering system controller, such as controller 100, as is generally illustrated in FIG. 2A. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, the controller 100 may estimate a motor torque using the one or more signals. In some embodiments, the controller 100 generate a requested assist torque based on the one or more signals. The assist torque may correspond to an amount of torque to be applied to one or more components of the steering system to assist the operator in rotating, for example, the handwheel. In some embodiments, the controller 100 may receive the requested assist torque from one or more various sources within the vehicle 10.

Figure 2B:
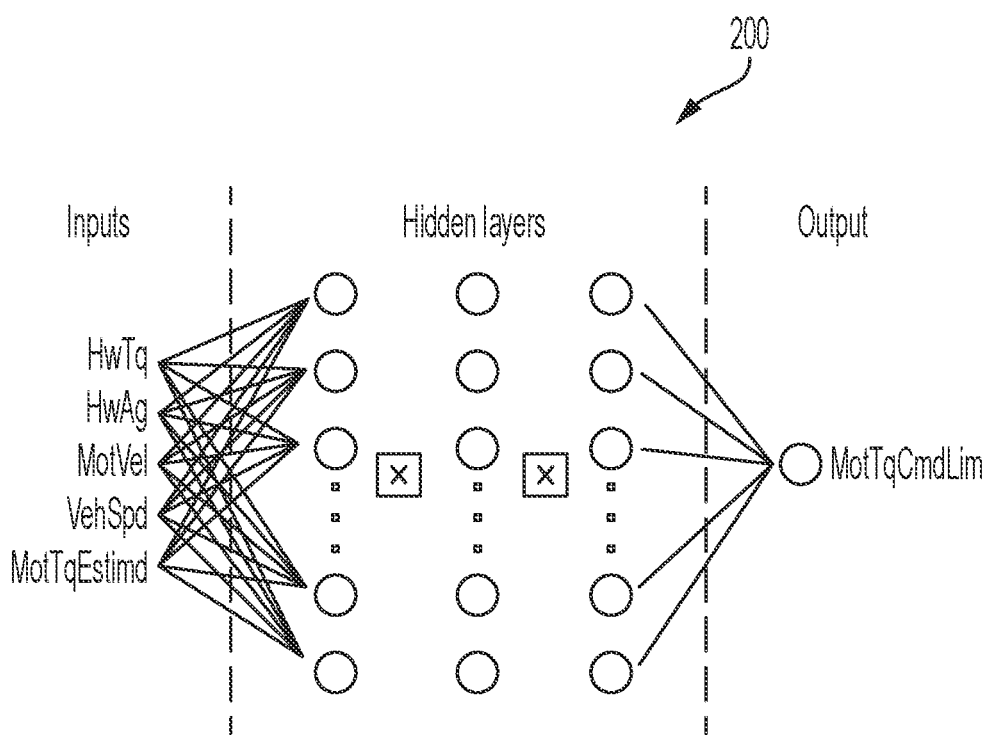
FIG. 2B generally illustrate an artificial neural network according to the principles of the present disclosure.

In some embodiments, the controller 100 may communicate with an artificial neural network 200. The artificial neural network 200 may be disposed within the vehicle 10 or be remotely located (e.g., on a computing device such as a mobile computing device or other suitable computing device or on a remotely located computing server or other suitable remotely located computing device). The artificial neural network 200 may include any suitable neural network and may include one or layers, such as the hidden layers generally illustrated in FIG. 2B.

In some embodiment, the artificial neural network 200 may receive the one or more signals from the sensors 106. As described, the one or more signals may indicate a handwheel torque, a handwheel angel, a motor velocity, a vehicle speed, other suitable information, or a combination thereof. The artificial neural network 200 may receive, from the controller 100 or other suitable source, the estimated assist torque.

In some embodiments, the controller 100 may receive at least one input. The at least one input may include a handwheel torque, a handwheel angle, a motor velocity, a vehicle speed, an estimated motor torque command, other suitable input, or a combination thereof. The controller 100 may communicate the at least one input to the artificial neural network 200.

In some embodiments, the at least one input may be communicated to the artificial neural network 200 from the sensors 106. Additionally, or alternatively, the artificial neural network 200 may receive the estimated motor torque from the controller 100 or other suitable source. The artificial neural network 200 may be configured to calculate an assist torque limit corresponding to a requested assist torque, generated by the controller 100 or other suitable source. In some embodiments, the artificial neural network 200 may be trained using data corresponding to one or more steering maneuvers, as described.

The controller 100 may receive, from the artificial neural network 200, the assist torque limit corresponding to the requested assist torque. The controller 100 may control at least one aspect of the steering system using the requested assist torque and the assist torque limit.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 3:
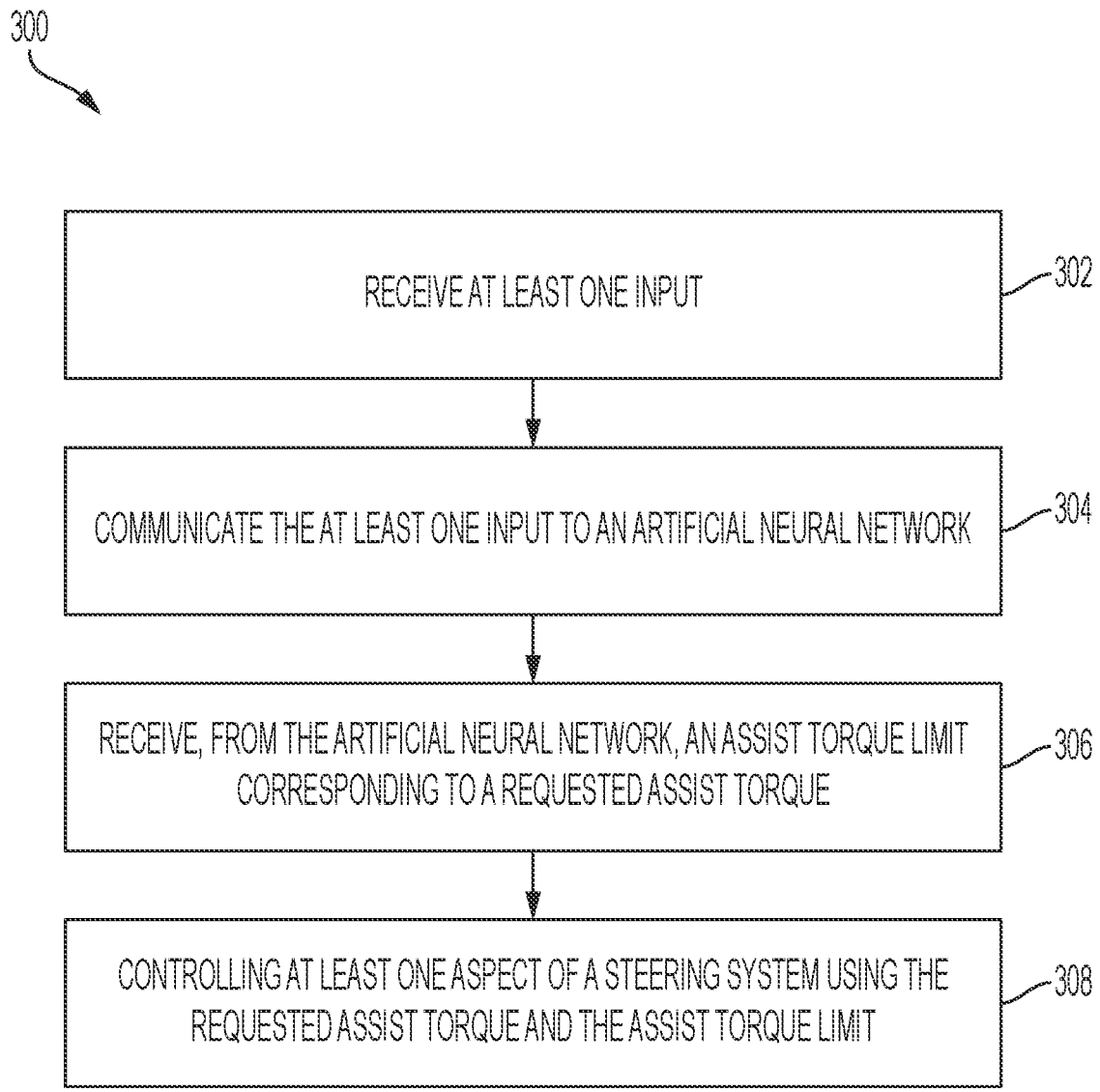
FIG. 3 is a flow diagram generally illustrating an assist torque limit calculation method according to the principles of the present disclosure.

FIG. 3 is a flow diagram generally illustrating an assist torque limit calculation method 300 according to the principles of the present disclosure. At 302, the method 300 receives at least one input. For example, the controller 100 may receive the at least one input.

At 304, the method 300 may communicate the at least one input to an artificial neural network. For example, the controller 100 may communicate the at least one input to the artificial neural network 200. In some embodiments, the artificial neural network 200 may receive the at least one input from the sensors 106 or other suitable source.

At 306, the method 300 receives, from the artificial neural network, an assist torque limit corresponding to a requested assist torque. For example, the controller 100 may receive the assist torque limit (e.g., generated by the artificial neural network 200, as described) corresponding to the requested assist torque from the artificial neural network 200.

At 308, the method 300 controls at least one aspect of the steering system using the requested assist torque and the assist torque limit. For example, the controller 100 may control the at least one aspect of the steering system using at least the requested assist torque and the assist torque limit.

In some embodiments, a method for calculating at least one functional limit for a requested assist torque in a steering system includes receiving at least one input and communicating the at least one input to an artificial neural network, wherein the artificial neural network is configured to calculate an assist torque limit corresponding to the requested assist torque. The method also includes receiving, from the artificial neural network, the assist torque limit corresponding to the requested assist torque and controlling at least one aspect of the steering system using the requested assist torque and the assist torque limit.

In some embodiments, the at least one input includes at least one of a handwheel torque, a handwheel angle, a motor velocity, a vehicle speed, and an estimated motor torque. In some embodiments, the artificial neural network is trained using data corresponding to one or more steering maneuvers. In some embodiments, the data corresponding to the one or more steering maneuvers includes at least one of return torque path data, damping torque path data, and end of travel torque path data. In some embodiments, the steering system includes an open-loop feedback control system. In some embodiments, the steering system includes a closed-loop feedback control system. In some embodiments, the steering system includes an electronic power steering system. In some embodiments, the steering system includes a steer-by-wire steering system. In some embodiments, the steering system includes a hydraulic steering system.

In some embodiments, a system for calculating at least one functional limit for a requested assist torque in a steering system includes a processor and a memory. The memory includes instructions that, when executed by the processor, cause the processor to: receive at least one input; communicate the at least one input to an artificial neural network, wherein the artificial neural network is configured to calculate an assist torque limit corresponding to the requested assist torque; receive, from the artificial neural network, the assist torque limit corresponding to the requested assist torque; and control at least one aspect of the steering system using the requested assist torque and the assist torque limit.

In some embodiments, the at least one input includes at least one of a handwheel torque, a handwheel angle, a motor velocity, a vehicle speed, and an estimated motor torque. In some embodiments, the artificial neural network is trained using data corresponding to one or more steering maneuvers. In some embodiments, the data corresponding to the one or more steering maneuvers includes at least one of return torque path data, damping torque path data, and end of travel torque path data. In some embodiments, the steering system includes an open-loop feedback control system. In some embodiments, the steering system includes a closed-loop feedback control system. In some embodiments, the steering system includes an electronic power steering system. In some embodiments, the steering system includes a steer-by-wire steering system. In some embodiments, the steering system includes a hydraulic steering system.

In some embodiments, an apparatus for calculating at least one functional limit for a requested assist torque in a steering system includes a processor and a memory. The memory includes instructions that, when executed by the processor, cause the processor to: receive at least one input that includes at least one of a handwheel torque, a handwheel angle, a motor velocity, a vehicle speed, and an estimated motor torque; communicate the at least one input to an artificial neural network trained using data corresponding to one or more steering maneuvers, wherein the artificial neural network is configured to calculate an assist torque limit corresponding to the requested assist torque; receive, from the artificial neural network, the assist torque limit corresponding to the requested assist torque; and control at least one aspect of the steering system using the requested assist torque and the assist torque limit.

In some embodiments, the data corresponding to the one or more steering maneuvers includes at least one of return torque path data, damping torque path data, and end of travel torque path data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for calculating at least one functional limit for a requested assist torque in a steering system, the method comprising:
   receiving at least one input;
   communicating the at least one input to an artificial neural network, wherein the artificial neural network is configured to calculate an assist torque limit corresponding to the requested assist torque;
   receiving, from the artificial neural network, the assist torque limit corresponding to the requested assist torque; and
   controlling at least one aspect of the steering system using the requested assist torque and the assist torque limit.

2. The method of claim 1, wherein the at least one input includes at least one of a handwheel torque, a handwheel angle, a motor velocity, a vehicle speed, and an estimated motor torque.

3. The method of claim 1, wherein the artificial neural network is trained using data corresponding to one or more steering maneuvers.

4. The method of claim 3, wherein the data corresponding to the one or more steering maneuvers includes at least one of return torque path data, damping torque path data, and end of travel torque path data.

5. The method of claim 1, wherein the steering system includes an open-loop feedback control system.

6. The method of claim 1, wherein the steering system includes a closed-loop feedback control system.

7. The method of claim 1, wherein the steering system includes an electronic power steering system.

8. The method of claim 1, wherein the steering system includes a steer-by-wire steering system.

9. The method of claim 1, wherein the steering system includes a hydraulic steering system.

10. A system for calculating at least one functional limit for a requested assist torque in a steering system, the system comprising:
    a processor; and
    a memory including instructions that, when executed by the processor, cause the processor to:
       receive at least one input;
       communicate the at least one input to an artificial neural network, wherein the artificial neural network is configured to calculate an assist torque limit corresponding to the requested assist torque;
       receive, from the artificial neural network, the assist torque limit corresponding to the requested assist torque; and
       control at least one aspect of the steering system using the requested assist torque and the assist torque limit.

11. The system of claim 10, wherein the at least one input includes at least one of a handwheel torque, a handwheel angle, a motor velocity, a vehicle speed, and an estimated motor torque.

12. The system of claim 10, wherein the artificial neural network is trained using data corresponding to one or more steering maneuvers.

13. The system of claim 12, wherein the data corresponding to the one or more steering maneuvers includes at least one of return torque path data, damping torque path data, and end of travel torque path data.

14. The system of claim 10, wherein the steering system includes an open-loop feedback control system.

15. The system of claim 10, wherein the steering system includes a closed-loop feedback control system.

16. The system of claim 10, wherein the steering system includes an electronic power steering system.

17. The system of claim 10, wherein the steering system includes a steer-by-wire steering system.

18. The system of claim 10, wherein the steering system includes a hydraulic steering system.

19. An apparatus for calculating at least one functional limit for a requested assist torque in a steering system, the apparatus comprising:
- a processor; and
- a memory including instructions that, when executed by the processor, cause the processor to:
  - receive at least one input that includes at least one of a handwheel torque, a handwheel angle, a motor velocity, a vehicle speed, and an estimated motor torque;
  - communicate the at least one input to an artificial neural network trained using data corresponding to one or more steering maneuvers, wherein the artificial neural network is configured to calculate an assist torque limit corresponding to the requested assist torque;
  - receive, from the artificial neural network, the assist torque limit corresponding to the requested assist torque; and
  - control at least one aspect of the steering system using the requested assist torque and the assist torque limit.

20. The apparatus of claim 19, wherein the data corresponding to the one or more steering maneuvers includes at least one of return torque path data, damping torque path data, and end of travel torque path data.

* * * * *